United States Patent [19]

Thomas et al.

[11] Patent Number: 5,059,146

[45] Date of Patent: Oct. 22, 1991

[54] METHOD OF ADJUSTING A LIGHT SOURCE FOR COLOR TEMPERATURE AND CHROMATICITY

[75] Inventors: Brian J. Thomas, Phoenix; Timothy W. Graham, Union Springs; Daniel C. Briggs, Camillus, all of N.Y.

[73] Assignee: Welch Allyn, Inc., Skaneateles Falls, N.Y.

[21] Appl. No.: 483,901

[22] Filed: Feb. 22, 1990

[51] Int. Cl.⁵ ............................................... H01J 9/42
[52] U.S. Cl. ........................................ 445/4; 445/22; 445/27
[58] Field of Search ................... 445/4, 27, 64, 22; 362/264, 265

[56] References Cited

U.S. PATENT DOCUMENTS

| | | | |
|---|---|---|---|
| 883,944 | 4/1908 | Fish | 362/2 |
| 1,043,009 | 10/1912 | Hoffman | 362/293 |
| 1,083,326 | 1/1914 | Hoffman | 362/293 |
| 1,807,350 | 5/1931 | Stimson | 362/293 |
| 3,202,811 | 8/1965 | Hall, Jr. | 362/2 |
| 3,322,946 | 5/1967 | Cooper | 362/345 |
| 3,379,868 | 4/1968 | Taillon | 362/263 |
| 3,427,625 | 2/1969 | Kazimi | 343/840 |
| 3,527,974 | 9/1970 | Cooper | 313/113 |
| 3,588,488 | 6/1971 | Lauterbach | 240/1.4 |
| 3,700,881 | 10/1972 | Slomski | 362/265 |
| 3,840,417 | 9/1974 | Yager | 264/1 X |
| 4,072,856 | 2/1978 | Eligehausen | 362/327 |
| 4,095,881 | 6/1978 | Maddox | 362/293 |
| 4,310,772 | 1/1982 | Tyler et al. | 445/4 |
| 4,315,186 | 2/1982 | Hirano et al. | 313/111 |
| 4,423,348 | 12/1983 | Greiler | 362/264 |
| 4,429,249 | 1/1982 | Tyler et al. | 445/4 |
| 4,528,478 | 7/1985 | Rothwell, Jr. et al. | 313/638 |
| 4,612,473 | 9/1986 | Nilssen | 313/111 |
| 4,728,848 | 3/1988 | Walsh | 313/634 |
| 4,808,876 | 2/1989 | French et al. | 313/635 |
| 4,816,714 | 3/1989 | Walsh | 313/111 |

Primary Examiner—Kenneth J. Ramsey
Attorney, Agent, or Firm—Wall and Roehrig

[57] ABSTRACT

Apparatus and a method for combining radiant energy of substantially distinct spectral bands to produce a light source having predetermined color temperature or chromaticity characteristics. The apparatus comprises a generating source that generates emissions of radiant energy from at least two spatial emission regions. Each of the spatial emission regions emits radiant energy in a substantially distinct spectral band. The apparatus further comprises an optical directing system that directs a substantial portion of the radiant energy emitted from the emission regions. The optical directing system includes a positioning region that contains a near focus and a combining region that contains a far focus. The generating source is supported substantially within the positioning region of the optical directing system such that the radiant energy, emitted from the spatial emission regions, is substantially directed to the far focus and combined within the combining region to produce an effective light source having predetermined color temperature or chromaticity characteristics.

13 Claims, 5 Drawing Sheets

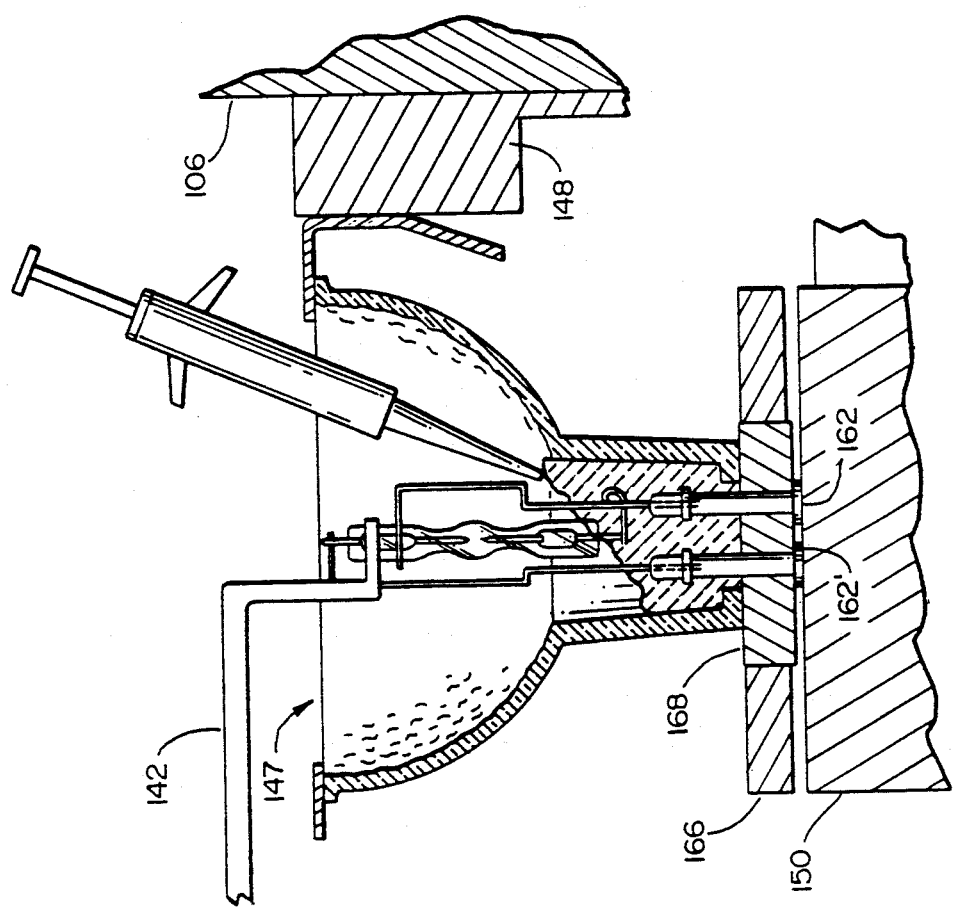
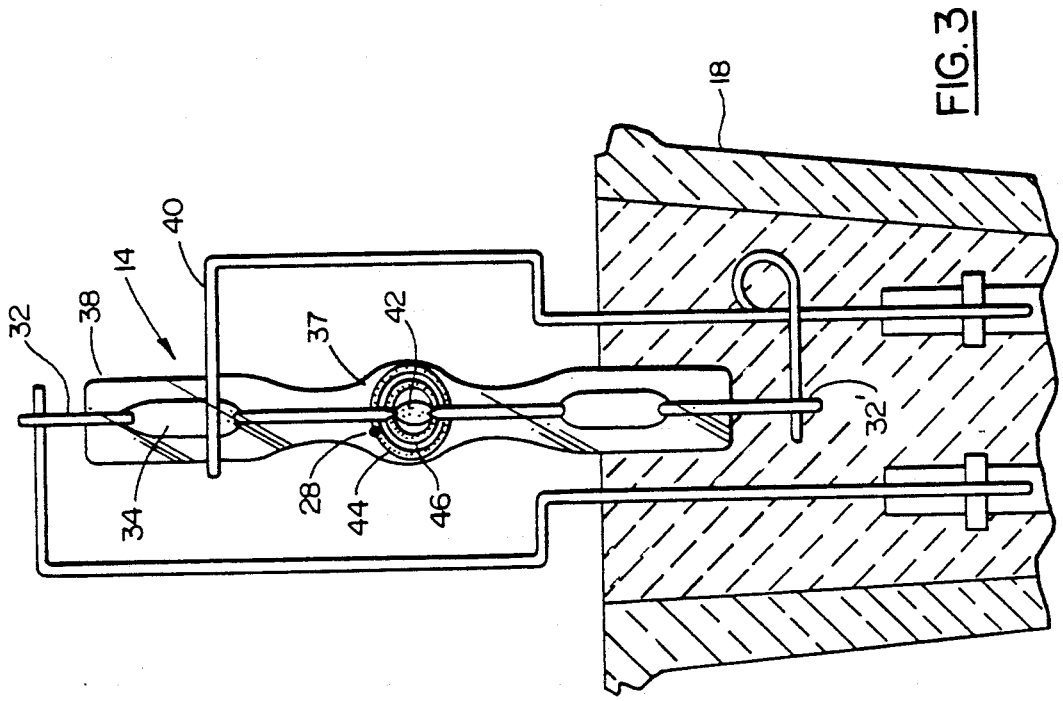

METHOD OF ADJUSTING A LIGHT SOURCE FOR COLOR TEMPERATURE AND CHROMATICITY

BACKGROUND OF THE INVENTION

This invention relates in general to the field of light sources for applications in which color temperature and chromaticity characteristics are important factors. Such applications arise, for example, in the medical and dental fields. In particular, this invention relates to metal halide discharge lamps and techniques used in connection therewith to produce light sources having desired color temperature and chromaticity characteristics.

In a typical high-intensity discharge metal halide lamp, a pair of refractory metal electrodes are sealed into a quartz arc chamber or emission envelope spaced apart in relation to each other. Each electrode terminates at a tip and, together, the tips define an arc discharge path therebetween. The arc chamber contains a chemical fill of mercury, a metal halide, and a rare gas, such as argon, at a pressure of several Torr.

Light is emitted from the lamp when a discharge is produced between the electrode tips. At discharge, the temperature of the arc chamber rapidly increases, causing the condensed mercury and metal halide to vaporize. The mercury atoms and the metal atoms of the metal halide are ionized and excited, causing emissions of radiation at spectrums that are characteristic of the metals. This radiation is substantially combined within the arc chamber to produce a resultant light output. However, metal halides tend to emit radiation, at their dominant spectrums, in regions spatially removed from the discharge arc. This may result in a secondary light output at the dominant spectrum. For instance, the metal halide, sodium iodide, will emit an orange halo from the arc chamber.

The halo or ring produced by metal halides has been considered undesirable in many light source applications. Therefore, aperture stops have been used to physically block the halo emission before coupling the light output for its intended application. Rather than eliminate this halo, the present invention utilizes it to produce a light output having color temperature or chromaticity characteristics optimum for a given application.

In many light source applications, including those in the field of medical and dental instruments, a lamp may be operated in conjunction with an optical system that includes a concave reflector. The optical system is adapted to direct light, emitted from the lamp, to a desired target area for illumination. The primary goal for these optical systems has been to maximize the light output of the lamp. Color temperature or chromaticity characteristics of the system have not been a prime consideration and, in most cases, have been ignored entirely.

One example of such a system is described in U.S. Pat. No. 3,700,881, entitled "Lamp and Reflector Assembly." The preferred embodiment described therein is an ellipsoidal reflector containing a metal halide high-intensity arc lamp. In manufacture, the arc lamp is adjusted so that the brightest part of the arc is exactly at the near focus of the reflector for maximum light output. Unlike the present invention, the system's color temperature or chromaticity characteristics are not optimized for the system's intended applications.

These characteristics are now an important consideration in the design of medical and dental instruments and operating and examining room lighting. For example, plastic surgeons prefer light that is as close to natural daylight as possible to observe the true colors of the patient's skin and any tumors or lesions growing thereon. In addition, designs for operating rooms have been proposed with light sources approximating natural daylight. The color temperature of these light sources have been specified between 5,500° K. and 6,000° K.

Specific examples of these light sources are described in U.S. Pat. Nos. 4,072,856 and 3,588,488. The 4,072,856 patent discloses a fixture having a multi-layered reflector. The reflector provides a spectral distribution of reflected light approximating daylight and having a color temperature of 5,500° K. A shield is used to prevent direct illumination from the lamp. Only light corrected by the reflector is emitted from the fixture. The fixture is a complicated article of manufacture, requiring careful deposition of compensating layers onto a substrate. The fixture also requires a light shield as an additional component. The 3,588,488 patent discloses a similarly complicated fixture including various filters and multi-layered coatings for correcting the light emitted from a halogen lamp. The present invention, on the other hand, provides for a less complex and more efficient light source, as a result of direct illumination and the achievement of color correction without filtering.

In another effort, a metal halide lamp has been proposed in U.S. Pat. 4,528,478 purporting to achieve substantially "white" light by selecting the proper amount and combination of metal halides. However, this approach requires exceptional precision during the manufacture of the lamp to achieve repeatable performance. In addition, the lamp's color performance is extremely sensitive to the proportions of metal halides used. Therefore, normal consumption and condensation behavior of the metal halides, during lamp operation, will cause the color characteristics of these lamps to vary over time and from one lamp to another. On the other hand, the present invention provides a light source that is relatively insensitive to normal metal halide consumption and variations in condensation.

OBJECTS AND SUMMARY OF THE INVENTION

It is accordingly an object of the present invention to provide an apparatus and method that overcomes the problems with the prior art.

Another object of the present invention is to provide an apparatus and method that optimizes color temperature or chromaticity characteristics of a light source for an intended application.

A further object of the present invention is to provide an apparatus and method that optimizes the color temperature or chromaticity characteristics of a light source by utilizing substantially all the spectral components of the radiant energy emitted from the lamp.

Still another object of the present invention is to provide an apparatus and method that optimizes color temperature or chromaticity characteristics of a light source without the use of filters or coatings.

Yet another object of the present invention is to provide a metal halide based light source, with optimized color temperature or chromaticity characteristics, that is relatively insensitive to normal operational and manufacturing variations in the metal halide lamp.

Yet a further object of the present invention is to provide a metal halide based light source, with optimized color temperature or chromaticity characteristics, that is relatively simple in design and efficient in operation.

These and other objects are attained in accordance with the present invention wherein there is provided an apparatus or method for combining radiant energy of substantially distinct spectral bands to produce a light source having predetermined color temperature or chromaticity characteristics. An apparatus in accordance with the present invention comprises a means for generating emissions of radiant energy from at least two spatial emission regions. Each of the emission regions emits radiant energy in substantially distinct spectral bands. The apparatus further includes an optical directing means for directing a substantial portion of the radiant energy emitted from the emission regions. The directing means includes a positioning region that contains a near focus and a combining region that contains a far focus. Also included is a means for supporting the generating means substantially within the positioning region of the directing means such that the radiant energy, emitted from the emission regions, is substantially directed to the far focus and combined within the combining region of the reflecting means to produce a light source having predetermined color temperature and chromaticity characteristics.

BRIEF DESCRIPTION OF THE DRAWING

One way of carrying out the invention is described in detail below with reference to drawings which illustrate two specific embodiments, in which

FIG. 3 is an enlarged fragmented cross-sectional view of the light source assembly shown in FIG. 2, particularly emphasizing the lamp portion of the inventive assembly;

FIG. 5 is an enlarged fragmented cross-sectional view of a portion of the apparatus shown in FIG. 4, showing details of the assembly process according to the present invention;

DETAILED DESCRIPTION OF THE PREFERRED EMBODIMENT

Figure 1:
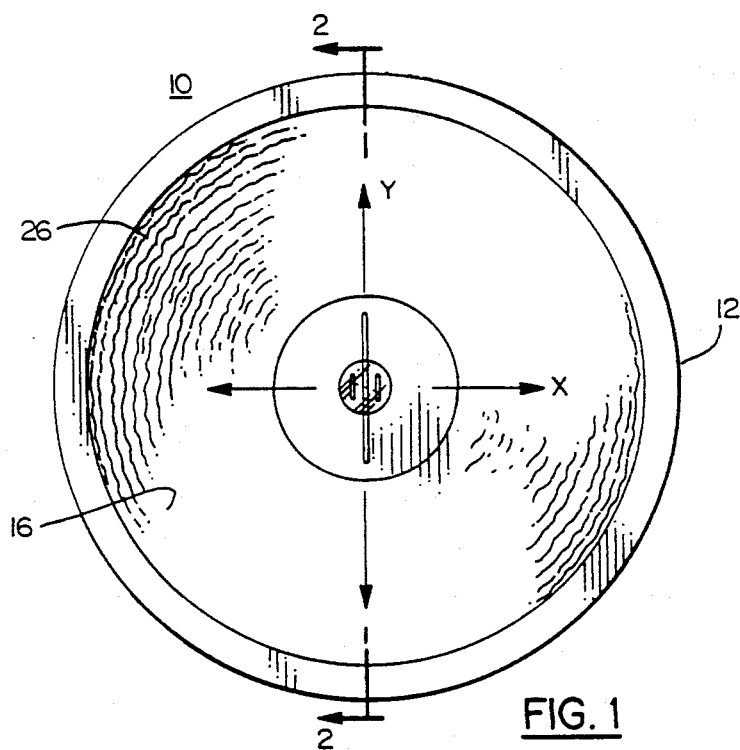
FIG. 1 is a top plan view of a light source assembly embodying the teachings of the present invention.
Figure 2:
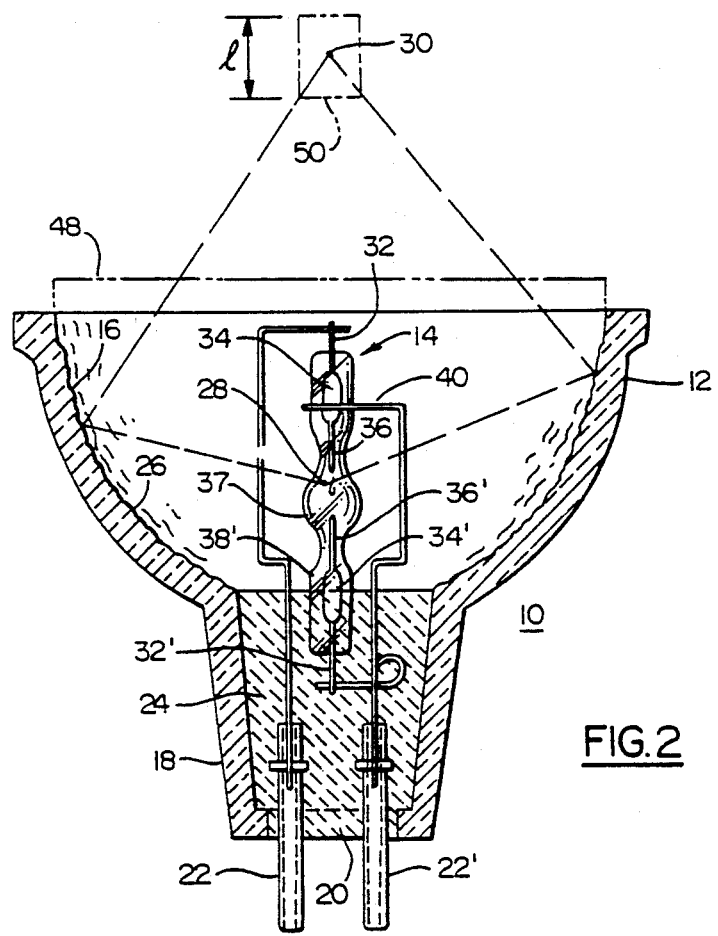
FIG. 2 is a cross-sectional view of the light source assembly taken along the line 2—2 as shown in FIG. 1.

Referring now to FIGS. 1 and 2 there is shown a light source assembly 10 according the present invention. Assembly 10 includes a means for optically directing radiant energy, such as a light reflector assembly 12, and a means for generating emissions of radiant energy, such as a discharge arc lamp 14.

Reflector assembly 12 is made of 7251 glass and is manufactured by Corning Glass Works, Corning, N.Y. Reflector assembly 12 has a light reflecting surface 16, formed in the shape of a truncated ellipsoid. Reflector surface 16 is deposited on the interior surface of reflector assembly 12. Projecting from the rear of reflector assembly 12, is a collar 18 integrally formed with the main body of reflector assembly 12. Collar 18 contains a rear aperture 20. Extending through aperture 20 are pin conductors 22 and 22'. Pin conductors 22, 22' are fixed in position by a supporting means, such as a ceramic or glassy cement compound 24. Cement compound 24 can be a zirconiumoxide product manufactured by Cotronics.

Referring to FIGS. 1 and 2, it is shown that reflecting surface 16 contains a multiplicity of shallow facets or dimples 26 formed thereon. The formation of facets 26 are achieved by molding the interior surface of reflector assembly 12 with the specified facet arrangement.

Light reflecting surface 16 comprises a dichroic coating. The dichroic coating is thin enough to conform to the facet arrangement molded on the interior surface of lamp assembly 12. The result is a reflecting surface containing a multiplicity of facets or dimples formed thereon. In the preferred embodiment, as disclosed in FIGS. 1 and 2, the distribution of facets 26 are random and substantially span the entire reflecting surface 16. Facets 26 cause the radiant energy being reflected from reflecting surface 16 to be slightly diffused. Their function in connection with the present invention will be described below.

The dichroic coating of reflecting surface 16 allows infra-red and ultraviolet radiant energy to pass therethrough. Therefore, a substantial portion of the thermal energy contained in the infra-red spectrum is directed away from the target area of light source 10. In addition, a substantial portion of the harmful energy contained in the ultraviolet spectrum is directed away from the target area of light source 10. The radiant energy that is reflected by reflecting surface 16 is primarily in the visible light spectrum. However, the invention is not limited to reflecting visible light. Reflecting surface 16 can be configured to reflect portions of the radiant energy spectrum outside the visible range.

It is well known in the art of optics that an ellipsoidal reflector has two focal points associated therewith: a near focus 28 and a far focus 30, as shown in FIG. 2. Near focus 28 and far focus 30 are aligned along an optical axis of reflector assembly 12. An ellipsoidal reflector is designed to receive light from a point source located at its near focus and direct the light to its far focus. Therefore, reflecting surface 16 will direct a maximum of incident light to far focus 30 if an ideal point light source is located exactly at near focus 28. However, as explained below, the objects of the present invention may not be attained under such circumstances.

It is to be understood that the present invention in not limited to the use of an ellipsoidal reflector. This element may be substituted by any optical system having a near focus and a far focus and configured to direct radiant energy, received from a source located at the near focus, to the far focus. One example of such an optical system is a parabolic reflector aligned with a condensing lens. Another example, is a collimating lens aligned with a condensing lens.

Again, referring to FIGS. 1 and 2, pin conductors 22, 22' are electrically connected to a pair of inlead wires 32, 32' of lamp 14. Inleads 32, 32' of lamp 14 are essentially metal wires made of molybdenum. Inleads 32, 32' provide the physical input to lamp 14 for electrical current during the starting and operation of lamp 14. Inleads 32, 32' are physically connected to respective foil seals 34, 34' which are, in turn, connected to respective electrodes 36, 36' of lamp 14. Inlead wires 32, 32' are lap welded to respective foil seals 34, 34'. Foil seals 34, 34' are shaped as thin foil-like sheets of molybdenum material. Electrodes 36, 36' are also connected to respective foil seals 34, 34' by a lap weld. Electrodes 36, 36' are made of a refractory metal such as tungsten.

Electrodes 36, 36' are sealed into an emission envelope or arc chamber 37 in spaced apart relation to each other. Each electrode terminates at a tip and, together, these tips define an arc discharge path therebetween.

Arc chamber 37 is defined by a bulb made of a transparent material such as quartz or fused silica. In the preferred embodiment, the geometry of the bulb is approximately an ellipsoid or sphere.

As shown in FIG. 2, extending from the quartz bulb of lamp 14 is a pair of diametrically opposed quartz stems 38, 38'. Stems 38, 38' are integrally formed with the bulb, as a single manufacture. A hermetic seal is established within the stems at foil seals 34, 34'.

In FIGS. 2 and 3, there is shown an external starting aid 40, which is a device for improving the starting performance of lamp 14. Starting aid 40 will cause lamp 14 to start more reliably and at a lower value of starting voltage. Starting aid 40 is made of nickel material and is positioned outside arc chamber 37. Starting aid 40 is connected electrically to inlead wire 32' and extends from this electrode to quartz stem 38. Starting aid 40 is wrapped around stem 38 at foil seal 34. The basic theory of operation and construction of starting aid 40 is well known to persons of ordinary skill in the lamp-making art. For example, U.S. Pat. No. 4,053,809 to Fridrich et al discloses an external starting device similar to starting aid 40.

The particular method of manufacturing lamp 14 is not essential to the understanding of the present invention. Several methods of manufacturing a metal halide discharge lamp are well known in the art. For example, see U.S. Pat. Nos. 3,263,852; 3,305,289; 3,685,880; 3,897,233 and 4,389,201. In addition, design guidelines for a metal halide high intensity discharge lamp is disclosed in U.S. Pat. No. 4,161,672.

With further reference to FIGS. 2 and 3, arc chamber 37 contains the usual chemical fill necessary for operation of a metal halide lamp. At room temperature, the chemical fill within arc chamber 37 consists of condensed mercury, at least one metal halide additive, and a rare gas such as argon at a pressure of several Torr. Radiant energy, substantially in the visible light spectrum, is generated within arc chamber 37 when a discharge is produced between the electrode tips. At discharge, the temperature within arc chamber 37 rapidly increases, causing the condensed mercury and metal halide additives to vaporize. The mercury atoms and the metal atoms of the metal halide additives are ionized and excited, causing emissions of radiation at spectral bands characteristic of the respective metals. The radiation is substantially combined within arc chamber 37 to produce a resultant light output.

However, not all the radiation is combined. Metal halides tend to emit radiation, at their dominant spectral bands, in regions spatially removed from the discharge arc. This results in an incomplete combination of the radiation within arc chamber 37 and a secondary light output at the dominant spectral band of the metal halide. This phenomenon is well known in the metal halide lamp art, and is described in greater detail in U.S. Pat. No. 4,528,478 to Rothwell, Jr. et al.

As shown in FIG. 3, a discharge arc 42 is established in arc chamber 37 of lamp 14. Arc 42 comprises radiant energy primarily generated from excitation of mercury atoms. Approximately all of the radiation derived from the mercury fill is emitted from arc 42. Arc 42 defines a central emission region. It is well known that the radiant energy generated from mercury is substantially contained in the ultraviolet, violet, blue, and green spectral bands; and, the dominant spectral bands are blue and green.

The metal halide additives contained in arc chamber 37 of lamp 14 may be, for example, sodium iodide and scandium triiodide. Sodium atoms emit radiation from a spatial emission region that resembles a ring or halo and substantially encircles the discharge arc. The radiation emitted from the sodium emission region is primarily in the red spectral band. In FIG. 3, a sodium emission region 44 is shown encircling arc region 42 and spatially separated therefrom. Emission region 44 will tend to produce a secondary light output having a red color.

In addition to the effects of the sodium additive, the scandium additive may contribute to a third spatially separated emission region 46, as described by Rothwell, Jr. et al in U.S. Pat. No. 4,528,478. Rothwell indicates that the scandium emission region 46 may establish itself between the discharge arc and the red sodium emission region, as shown in FIG. 3.

Therefore, it is apparent from the above description that metal halide lamp 14 generates emissions of radiant energy from at least two spatially separated emission regions, each having distinct spectral characteristics. In addition, a third emission region may be established by proper selection of a second additive such as scandium.

The present invention is not limited to any specific metal halide additive or combination of additives. However, it is preferred that the metal halide additive be a bromide or iodide of at least one element selected from the group of elements consisting of sodium, scandium, thallium, thorium, lithium, zinc, cadmium, mercury, dysporsium and indium.

From the above description, the theory of operation of the present invention, as embodied in light source assembly 10, can be understood. The color temperature or chromaticity characteristics of light source assembly 10 is largely dependent upon the position of lamp 14 relative to reflector assembly 12. An object of the present invention is to set the position of lamp 14, relative to reflector assembly 12, to optimize color temperature or chromaticity characteristics for an intended application. A process, according to the present invention, for accomplishing this objective is described in detail below.

FIG. 2 shows a typical fixed position for lamp 14 to optimize color temperature or chromaticity characteristics for an unspecified application. Note that the discharge arc of lamp 14 is not centered on near focus 28. This can result because light source assembly 10 is not especially configured to produce a maximum light output. As will be described in detail below, the fixed position of lamp 14 was empirically determined by adjusting its position while taking measurements of color temperature or chromaticity of light produced at far focus 30.

The range of adjustments of lamp 14, that may take place during this process, can be defined by an imaginary positioning region 48. As shown in FIG. 2, for an ellipsoidal reflector, positioning region 48 may be defined by the boundaries of one-half of an imaginary ellipsoid aligned with and following the dimensions of reflecting surface 16. Depending upon the color temperature or chromaticity characteristics specified for a particular application, the optimum position for lamp 14 (as defined by the center of the arc path between the tips of electrodes 36, 36') may be at any point within positioning region 48.

For most applications, however, the position of lamp 14 will probably be located within a region centered about near focus 28 and having approximate dimensions of the arc chamber.

The color temperature or chromaticity characteristics of light source assembly 10 are established by combining or mixing the radiant energy, emitted from emission regions 42, 44 and 46. The combining or mixing takes place in a combining region 50, as shown in FIG. 2. Combining region 50 contains far focus 30 of reflecting surface 16. Combining region 50 is defined as that region within which a defined intensity level of radiant energy, emitted from lamp 14, is directed by operation of reflector assembly 12. Combining region 50, as shown in FIG. 2, is only a representation. Its dimensions and shape are dependent upon the design requirements of the particular light source being produced.

Since the emission regions contained in arc chamber 37 of lamp 14 are spatially separated and, at least in part, offset from near focus 28, their respective images are blurred and overlap each other at far focus 30. The respective images are projected as beams of radiant energy. Each beam is in a defocused or blurred condition as a result of being offset from near focus 28. The defocused beams overlap each other within combining region 50; and, their respective spectral bands blend with each other to produce a combined light output having an established color temperature or chromaticity.

The beams are further defocused or broadened by operation of facets 26. The multiplicity of facets 26 distributed randomly over reflecting surface 16 produce a marginal diffusing effect when light is incident thereon. Therefore, the beams forming from such a reflecting surface are more defuse than if produced from a smooth reflecting surface. The beam broadening produced by facets 26 enhances the combining of the spectral emissions at combining region 50.

The inventors have been able to construct, in accordance with the present invention, light sources having measured correlated color temperatures at 5,500° K., 4,500° K., 4,100° K. and 3,900° K.

Figure 4:
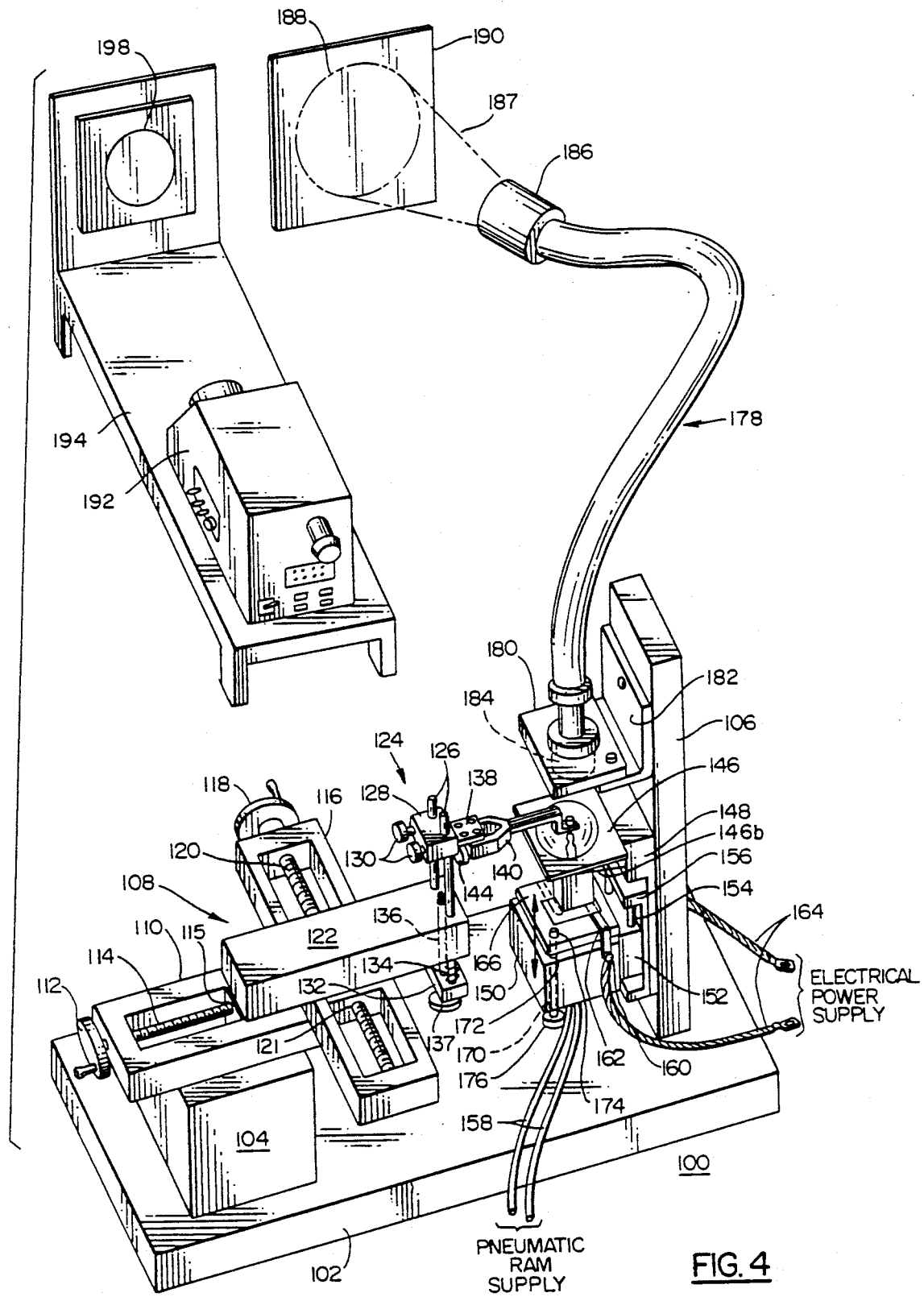
FIG. 4 is a top and front perspective view of an apparatus for assembling the light source assembly of FIG. 1 and showing a means for carrying out a method of producing a light source assembly according to the present invention.

Referring to FIG. 4, a perspective view of an apparatus 100 for assembling light source assembly 10 is shown. Assembly apparatus 100 includes a base 102, having affixed thereon a mounting block 104 and a fixture tower 106. A three-axis positioner or adjustable fixture 108 is mounted on mounting block 104. Three-axis positioner 108 provides a means for adjusting the position of an object in a three-dimensional Cartesian coordinate system, each coordinate being adjustable independently of the other. Three-axis positioner 108 is a well known commercially available device. One manufacturer of such a device is Velmex.

Three-axis positioner 108 has an X-axis positioner 110, having a crank wheel 112 and lead screw 114. Lead screw 114 is threaded through a slide carriage 115. As lead screw 114 is rotated by turning crank wheel 112, slide carriage 115 is propelled along the X-axis. A Y-axis positioner 116 is mounted onto slide carriage 115 of X-axis positioner 110, and includes a crank wheel 118, a lead screw 120, and a slide carriage 121. Mounted upon slide carriage 121 of Y-axis positioner 116 is a horizontal support member 122.

A Z-axis positioner 124 is supported on horizontal support member 122. Z-axis positioner 124 has a pair of slide rods 126 passing through a vertical carriage 128. Vertical carriage 128 slidably engages slide rods 126 and provides for a coarse adjustment means in the Z-axis. The position of vertical carriage 128 is fixed by a pair of locking screws 130. At the other end of slide rods 126 is a spacer block 132 containing a pair of bores mating with the ends of slide rods 126. A compression spring 134 is slipped over each slide rod 126 and positioned between spacer block 132 and horizontal support member 122.

Z-axis positioner 124 is mounted to horizontal support member 122 by a lead screw 136. Lead screw 136 is threaded through support member 122 and spacer block 132. Lead screw 136 is adjusted by a knob 137 projecting from the bottom side of spacer block 132. Fine adjustments of slide rods 126, in the Z axis, are achieved by adjusting lead screw 136. Compression springs 134 ensure that a positive bias exists in a downward direction against spacer block 132.

Attached to vertical carriage 128 is a carriage bracket 138. An adjustable lamp clamp 140 is mounted to carriage bracket 138 by four bolts, as shown in FIG. 4.

Adjustable lamp clamp 140 includes a pair of jaws 142, as shown in FIGS. 4 and 5. Jaws 142 are adjustable to move together or apart. An adjustment knob 144, located at the rear of lamp clamp 140, is used to effectuate the adjustment of jaws 142 by operation of a worm screw and gear arrangement (not shown). As shown in FIGS. 4 and 5, jaws 142 are adjusted to securely hold an assembled lamp for positioning during the process according to the present invention.

A supporting fixture 146 for a reflector assembly is mounted to a mounting bracket 148 which, in turn, is mounted to fixture tower 106. Supporting fixture 146 is configured to receive a reflector assembly under its top frame portion 146a, as clearly shown in FIG. 5. A reflector assembly is resiliently held into fixture 146 by a pair of supporting wires, only one of which is shown in FIG. 4, and designated 146b. Supporting fixture 146 contains an optical aperture 147 to allow light emitted from the assembled lamp to be directed out of the reflector assembly to a fiber optic light pipe, as described in detail below. A device, such as supporting fixture 146, is commercially available from GTE Sylvania Corporation, Exiter, New Hampshire.

A contact block 150 is provided to deliver electrical current to the assembled lamp once it is properly fixtured. Contact block 150 is provided with a slide carriage 152 which, in turn, is coupled to a pair slide rods 154, as shown in FIG. 4. Slide rods 154 are mounted in a slide assembly 156. This entire assembly permits contact block 150 to move up and down as shown by the arrow in FIG. 4. Contact block 150 is propelled upward by a pneumatic ram (not shown) which is situated on slide assembly 156 between slide rods 154. The pneumatic ram supply is furnished through pneumatic lines 158.

Contact block 150 comprises a pair of electrical contact leads 160, only one of which is shown in FIG. 4. The other contact lead is located on the opposite side of contact block 150, as referenced from the contact lead 160 shown in FIG. 4. Electrically connected to each contact lead 160 is a metal brush or contact strip 162, 162′, as shown in FIGS. 4 and 5. Contact brushes 162, 162′ extend from contact leads 160, and further extend along the top face of contact block 150, parallel to each other, as shown in FIGS. 4 and 5. Electrical current is furnished to contact brushes 162, 162′ from a power supply (not shown). A circuit is completed by a pair of cables 164 connected at one end to contact leads 160, and at the other end to the power supply.

A fixture for holding the pin conductors of an assembled lamp will now be described. As shown in FIGS. 4 and 5, a fixture base 166 is provided. Fixture base 166 contains a rectangular passage running therethrough, as shown in FIG. 5. A pin fixture 168, shaped as a rectangular plug, is inserted into the rectangular passage of fixture base 166. The dimensions of pin fixture 168 are such that a close fit is achieved with the rectangular passage of fixture base 166. Fixture base 166 is made of a thermal plastic material and pin fixture 168 is made of a silicone rubber material.

Pin fixture 168 contains a pair of generally cylindrical bores passing therethrough, as shown in FIG. 5. The cylindrical bores are dimensioned to resiliently receive the pin conductors of the assembled lamp. In addition, the cylindrical bores of fixture 168 are spaced apart at the desired pin conductor spacing for a completely assembled light source 10.

Fixture base 166 is coupled to contact block 150 by a pair of mating shafts 170, only one of which is shown in FIG. 4. The other shaft is located diagonally across fixture base 166. Shafts 170 slidably engage a bronze bushing or anti-friction bearing contained in contact block 150. Shafts 170 extend entirely through fixture base 166 and contact block 150. A compression spring 172 is slipped over each mating shaft 170 and situated between fixture base 166 and contact block 150.

Each mating shaft 170 is clamped to fixture base 166 by threading a nut 174 at its upper end. At the other end of each mating shaft 170, there is a short cylindrical metal stopper 176 threaded thereon. Stopper 176 is spaced from the bottom side of contact block 150 to allow a certain sliding movement of each mating shaft 170. The purpose of stopper 176 is merely to prevent each mating shaft 170 from being propelled out of contact block 150 by compression springs 172. The purpose of the spring biased mating arrangement, between fixture base 166 and contact block 150, is to accommodate reflector assemblies having different length dimensions.

As will be described in more detail below, the assembled lamp is in operation while it is being positioned within the reflector assembly. During the positioning process, the light output of the combined lamp and reflector assembly will be monitored and measured. This is accomplished by collecting the light output in a fiber optic bundle or light pipe 178, as shown in FIG. 4. One end of light pipe 178 is mounted to a support frame 180 which, in turn, is mounted to a support bracket 182. Support bracket 182 is mounted to fixture tower 106, as shown in FIG. 4. Light pipe 178 contains a heat absorbing filter located within an end barrel 184. As shown in FIG. 4, end barrel 184 is supported in frame 180.

Support frame 180 is disposed such that the end of light pipe 178 is located at the effective far focus of a reflector assembly mounted in support fixture 146. The end of light pipe 178 may be located beyond the ideal far focus point; however, due to the optical effects of the heat absorbing filter, situated in end barrel 184, the far focus is effectively extended by a distance equal to a approximately ⅜ the thickness of the heat absorbing filter.

At the other end of fiber optic light pipe 178 is another end barrel 186, housing a focusing optics system. The optics system comprises a cylindrical reflector situated between two biconvex lens.

Assembly apparatus 100 is employed to produce a light source having predetermined color temperature or chromaticity characteristics. This process is now described in detail, with reference to FIGS. 4–8. Initially, a reflector assembly is inserted into supporting fixture 146, as shown in FIGS. 4 and 5. Then an assembled lamp, including attached pin conductors, is placed between jaws 142. Lamp clamp 140 is adjusted such that jaws 142 securely support the assembled lamp during the positioning process.

The position of vertical carriage 128 is then adjusted to lower the assembled lamp into the fixtured reflector assembly, as shown in FIG. 5. Contact block 150 is propelled upward, by operation of the pneumatic ram, to a point where fixture base 166 is abutting against the collar of the reflector assembly, as shown in FIG. 5. Pin fixture 168 seals off the rear aperture of the collar to the reflector assembly. The pin conductors of the lamp are then manually urged into respective bores contained in pin fixture 168. The tips of the pin conductors protrude slightly from the bottom end wall of pin fixture 168, as shown in FIG. 5. Due to the proximity of contact block 150, electrical contact is made between contact brushes 162, 162′ and the pin conductors. Therefore, upon the application of an electric current over cables 164, the lamp is started and maintained in operation.

The light output generated from the lamp, as directed by the reflector assembly, is collected in light pipe 178. The light is focused as it passes through the focusing optics contained in end barrel 186, and is emitted from light pipe 178 as a beam 187.

Figure 6:
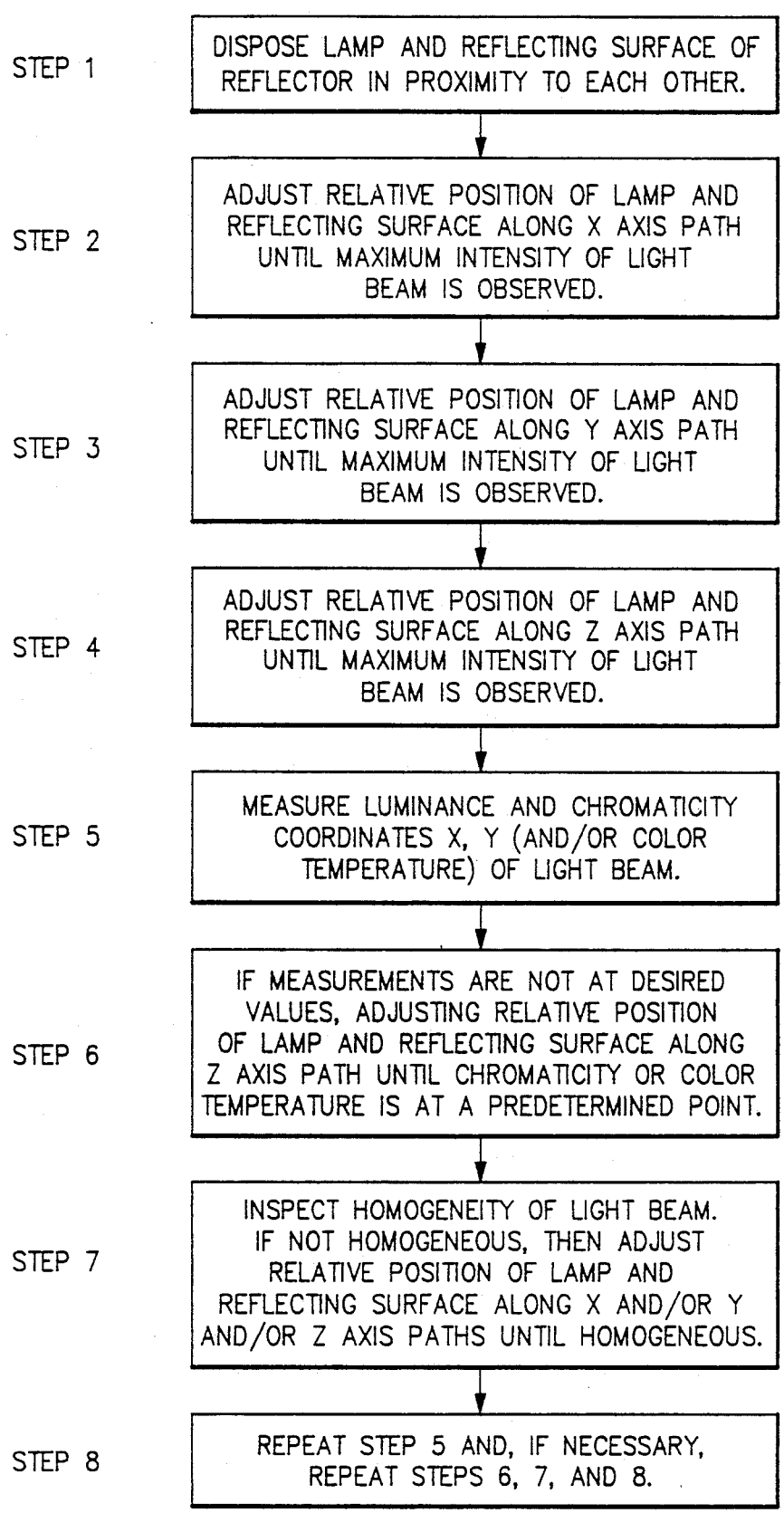
FIG. 6 is a block diagram outlining the method of producing a light source assembly according to the present invention.

Referring to FIG. 6, there is shown a block diagram outlining the process for producing a light source, according to the present invention. In the preferred embodiment, Step 1 of the process is completed once the assembled lamp is positioned within the reflector assembly and the pin conductors of the lamp are fixtured into pin fixture 168. As indicated, contact block 150 remains in its raised position to supply the electrical current to the lamp and maintain it in an operating condition during the process.

A Step 2 of the process is to adjust the position of the lamp, relative to the reflector assembly, along a defined X-axis path until a maximum of light intensity is observed. As shown in FIG. 4, crank wheel 112 of X-axis positioner 110 is manually turned to effectuate an X-axis position adjustment of the lamp. If crank wheel 112 is rotated clockwise, the lamp will move generally from left to right in FIG. 5. A counter-clockwise rotation will cause the lamp to reverse its direction of travel. While the lamp is being adjusted in the X-axis, beam 187 is observed as it appears on a plain white screen 188. The beam's illumination on the plain white screen is referred to as a beam pattern 190.

As the lamp is adjusted along the X-axis path, beam pattern 190 is observed to determine a fall off in light intensity. When this is observed, the direction of the lamp is reversed along the X-axis until a maximum light intensity is observed. That X-axis position is maintained while further positioning of the lamp is done along the Y and Z axes.

A Step 3 of the process includes adjusting the relative position of the lamp and the reflector assembly along a defined Y-axis path until a maximum intensity of light is observed. In the preferred embodiment, Step 3 is performed by manipulating Y-axis positioner 116 in the same manner as described for X-axis positioner 110. Adjustments along the Y-axis continue until a maximum light intensity is observed on screen 188. The Y-axis position is maintained while further positioning of the lamp is done along the Z-axis.

A Step 4 of the process includes adjusting the relative position of the lamp and the reflector assembly along a defined Z-axis path until a maximum intensity of light is observed. In the preferred embodiment, Step 4 is performed by manipulating Z-axis positioner 124 in the same manner as described for X-axis positioner 110 and Y-axis positioner 116. Positioner 124 is manipulated by adjusting lead screw 136, causing slide rods 126 to move up or down. Since vertical carriage 128 is fixed to slide rods 126, lamp clamp 140 is caused to move up or down in response to the adjustment of lead screw 136. Adjustments along the Z-axis continue until a maximum light intensity is observed on screen 188.

A Step 5 of the process is now undertaken by measuring luminance and the chromaticity coordinates X, Y (and/or the color temperature) of beam 187. The measurements are taken using a luminance colorimeter 192 positioned on an optical bench 194, as shown in FIG. 4. Colorimeter 192 is a TOPCON BM-7 luminance colorimeter, supplied by Hoffman Engineering Corporation, Stamford, CT. This instrument is a fully integrated photometer/colorimeter that produces readings of luminance, chromaticity and correlated color temperature. The readings of colorimeter 192 are displayed on a liquid crystal display 196. Since colorimeter 192 is an instrument well known and commercially available to the light measurement industry, a detailed description of its operation and construction is not herein provided.

Colorimeter 192 comprises a receive-optics system that is focused onto an object to be measured. In FIG. 4, the receive-optics of colorimeter 192 are focused onto a diffuse reflecting screen 198. Screen 198 is a near perfect diffuse reflector, reflecting greater than 99% of light incident thereon. Screen 198 is two inches in diameter. Screen 198 is an SRS-2 diffuse reflector, commercially available from Hoffman Engineering Corporation.

Figure 7:
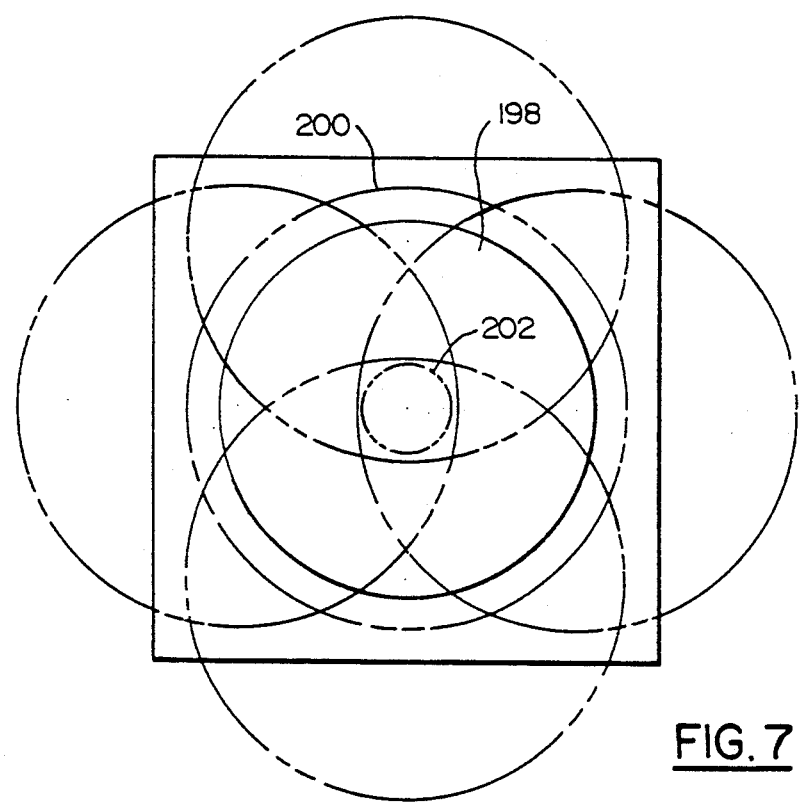
FIG. 7 is a front elevation view of a diffuse reflecting screen used in the method according to the present invention, and showing a light beam pattern at various positions and a measurement sample area.

Measurements of the light output are accomplished by illuminating screen 198 with light beam 187. In the measurement procedure, a three inch diameter beam pattern, produced by beam 187, is centered over screen 198, as shown in FIG. 7. A beam pattern 200 is established by manually setting the focusing optics of light pipe 178 approximately 16 inches from screen 198. As shown by phantom lines in FIG. 7, a $\frac{3}{4}$ inch sample area 202 is established on screen 198. The diameter of sample area 202 is a function of the receive-optics system in colorimeter 192 and the distance between screen 198 and colorimeter 192. Sample area 202 is centered on screen 198.

Once the sample area is established, and the receive-optics of colorimeter 192 are focused, measurements of the chromaticity coordinates X, Y and luminance are taken at five sample locations on beam pattern 200. Referring to FIG. 7, a first measurement is taken at the center of beam pattern 200 by centering beam 187 over screen 198. Following this measurement, four successive measurements are taken at the top, bottom, left and right extreme locations of beam pattern 200. These latter measurements are taken by offsetting beam pattern 200 relative to screen 198, as shown in FIG. 7. The five measurements are examined to determined whether they fall within a specified range for a particular application.

Once the X and Y chromaticity coordinates are obtained, the complete chromaticity characteristics of the light output can be determined by the relationship $X+Y+Z=1$. In many instances, the light source to be designed is specified by chromaticity coordinates. Hence, the above measurement procedure will yield the necessary data to determine whether the specifications have been met. However, in some instances, the light source is only specified in terms of color temperature. In that case, correlated color temperature readings are taken at each of the five sample locations on beam pattern 200, using colorimeter 192. Alternatively, the measured X, Y chromaticity coordinates can be applied to a C.I.E. Chromaticity Diagram to determine the correlated color temperature value.

If the measurements taken in accordance with Step 5 do not fall within the ranges specified for the light source, a Step 6 is performed. Step 6 includes adjusting the relative position of the lamp and the reflector assembly along the Z-axis path until the chromaticity coordinates or color temperature falls within the specified range. In the preferred embodiment, the Z-axis positioner 124 is manipulated by adjusting lead screw 136 in the same manner as described with respect to Step 4. The Z-axis adjustments of the lamp position are very slight, usually on the order of one-thousandth of an inch. It has been determined that an adjustment of the lamp position toward the reflector assembly, along the Z-axis, will cause the correlated color temperature measurement to decrease from the initially obtained value. Likewise, if the lamp position is adjusted away from the reflector assembly, along the Z-axis, the correlated color temperature measurement will increase from the initially obtained value.

Once the measurements of chromaticity or color temperature fall within the specified range, the homogeneity of beam pattern 200 is inspected in accordance with a Step 7 of the process outlined in FIG. 6. If beam pattern 200 is not homogeneous, then further adjustments are made of the relative position of the lamp and the reflector assembly along the X and/or Y and/or Z axes until beam pattern 200 appears homogeneous. The adjustments to the lamp position, in accordance with Step 7, are normally very slight, usually on the order of one-thousandth of an inch.

A beam pattern is homogeneous if it is devoid of shadows, dark or colored spots or blotches, rings, or lines, and generally appears uniform in intensity across the pattern.

It has been determined that certain non-uniformities of beam pattern 200 can be eliminated by adjusting the lamp position along a certain axis. For instance, dark or colored spots or blotches appearing on the left or right hand side of beam pattern 200 can be eliminated by adjusting the lamp position along the X-axis. In addition, blotches or spots appearing at the top or bottom of beam pattern 200 can be eliminated by adjusting the lamp position along the Y-axis. Further, a ring or halo can be eliminated from the beam pattern by adjusting the lamp position along the Z-axis.

Once beam pattern 200 is made uniform, a final Step 8 is performed, as outlined in FIG. 6. Pursuant to Step 8, the chromaticity or color temperature of beam pattern 200 is again measured in accordance with Step 5. Step 5 is repeated to determine whether these characteristics have fallen outside the specified range as a result of performing Step 7. Of course, if the measurements taken in Step 8 are outside the specified range, Steps 6 and 7 must be repeated.

Once the process, as outlined in FIG. 6, has been completed, the resulting light source assembly will produce a homogeneous light beam at the specified chromaticity or color temperature. At this point, the lamp position is fixed by injecting a ceramic or glassy cement compound into the collar of the reflector assembly, as shown in FIG. 5. The cement will surround the pin conductors of the lamp and fill the entire collar. A portion of the proximal stem of the lamp will be secured in the cement, as shown in FIG. 2. Once the cement hardens, the completed light source assembly is removed from supporting fixture 146.

Figure 8:
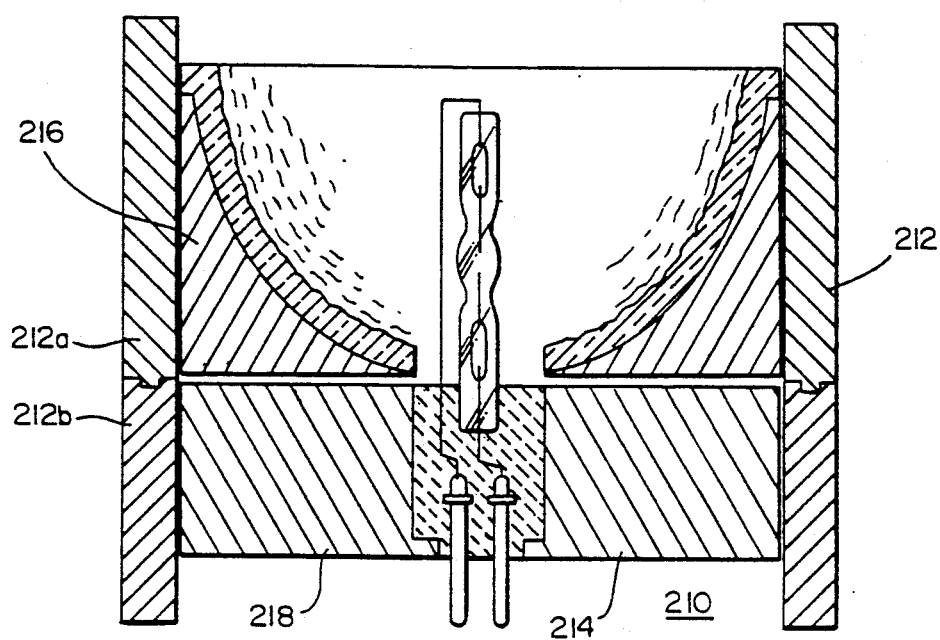
FIG. 8 is a schematic cross-sectional view of an alternative embodiment of the light source assembly shown in FIG. 1.

Referring now to FIG. 8, there is shown a schematic cross-sectional view of an alternative embodiment of light source assembly 10, in accordance with the present invention. As shown in FIG. 8, a light source assembly 210 is provided with a frame 212 for supporting both a lamp assembly 214 and a reflector assembly 216. As shown in FIG. 8, lamp assembly 214 is not connected to reflector assembly 216.

Lamp assembly 214 may be either attached permanently to frame 212 or removably engage frame 212 in some manner. For example, frame 212 may be configured as a hollow cylinder having a threaded portion formed on its interior wall. Lamp 214 may include a cylindrical base portion 218 having mating threads formed along its perimeter wall. Such a configuration would allow lamp assembly 214 to be threaded into frame 212 and adjusted into position. In another configuration, frame 212 may comprise at least two mating sections 212a and 212b, as shown in FIG. 8. Both arrangements would allow for expedient replacement of lamp assembly 214.

While the invention has been described in the specification and illustrated in the drawings with reference to the preferred embodiments, it will be understood by those skilled in the art that various changes may be made and equivalence may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out the invention, but that the invention will include any embodiments falling within the description of the appended claims.

What is claimed is:

1. A method of producing a light source having predetermined color temperature or chromaticity characteristics using an optical system having a near focus and a far focus disposed along an optical axis, and a radiant energy source that emits radiant energy from at least two spatial emission regions, the method comprising the steps of:
    (a) disposing said radiant energy source and the near focus of said optical system in proximity to each other such that a substantial amount of radiant energy emitted from said radiant energy source is directed to the far focus of said optical system;
    (b) adjusting the relative position of said radiant energy source and said optical system until a maximum intensity of radiant energy is produced at the far focus of said optical system;
    (c) measuring the color temperature or chromaticity characteristics of the radiant energy produced at the far focus of said optical system; and if said characteristics are not as predetermined, then
    (d) adjusting the relative position of said radiant energy source and said optical system along a line parallel to the optical axis of said optical system until the color temperature or chromaticity characteristics of the radiant energy at the far focus of said optical system are as predetermined.

2. The method as recited in claim 1, further comprising the steps of:
    (e) inspecting the homogeneity of the visible portion of the radiant energy; and if said visible portion is not homogeneous, then
    (f) adjusting the relative position of said radiant energy source and said optical system until said visible portion of said radiant energy is homogeneous; and
    (g) repeating step (c) and, if necessary, step (d).

3. The method as recited in claim 2, wherein said optical system is a concave reflector having a substantially ellipsoidal-shaped reflecting surface containing a multiplicity of dimples formed thereon.

4. The method as recited in claim 1, wherein the respective positions of said radiant energy source and said optical system are defined by a three-dimensional coordinate system, and wherein said step (b) includes
    adjusting in sequence the three-dimensional coordinates of said radiant energy source, each coordinate being adjusted until a maximum intensity of radiation is produced at the far focus of said optical system.

5. The method as recited in claim 4, further comprising the steps of
    (e) inspecting the homogeneity of the visible portion of the radiant energy; and if said visible portion is not homogeneous, then
    (f) adjusting the position of said radiant energy source until said visible portion of said radiant energy is homogeneous; and
    (g) repeating steps (c) and, if necessary, step (d).

6. The method as recited in claim 5, wherein said optical system is a concave reflector having a substantially ellipsoidal-shaped reflecting surface containing a multiplicity of dimples formed thereon.

7. The method as recited in claim 1, wherein the respective positions of said radiant energy source and said optical system are defined by a three-dimensional coordinate system, and wherein said step (b) includes
    adjusting in sequence the three-dimensional coordinates of said optical system, each coordinate being adjusted until a maximum intensity of radiant energy is produced at the far focus of said optical system.

8. The method as recited in claim 7, further comprising the steps of
    (e) inspecting the homogeneity of the visible portion of the radiant energy; and if said visible portion is not homogeneous, then (f) adjusting the position of said optical system until said visible portion of said radiant energy is homogeneous; and (g) repeating steps (c) and, if necessary, step (d).

9. The method as recited in claim 8, wherein said optical system is a concave reflector having a substantially ellipsoidal-shaped reflecting surface containing a multiplicity of dimples formed thereon.

10. The method as recited in claim 2, wherein the respective positions of said radiant energy source and said optical system are defined by a three-dimensional coordinate system, and wherein said step (b) includes adjusting in sequence the three-dimensional coordinates of said radiant energy source and said optical system, each coordinate of said optical system and said radiant energy source being adjusted until a maximum intensity of radiation is produced at the far focus of said optical system.

11. The method as recited in claim 10, further comprising the steps of (e) inspecting the homogeneity of the visible portion of the radiant energy; and if said visible portion is not homogeneous, then (f) adjusting the positions of said radiant energy source and said optical system until said visible portion of said radiant energy is homogeneous; and (g) repeating step (c) and, if necessary, step (d).

12. The method as recited in claim 11, wherein said optical system is a concave reflector having a substantially ellipsoidal-shaped reflecting surface containing a multiplicity of dimples formed thereon.

13. A method of manufacturing a light source having predetermined color temperature or chromaticity characteristics, comprising the steps of:

mounting a concave reflector, having a substantially ellipsoidal-shaped reflecting surface and having a near focus and a far focus disposed along an optical axis, in a supporting fixture;

selecting a metal halide discharge arc lamp that emits radiant energy in at least two substantially distinct spectral bands;

mounting said lamp in an adjustable fixture;

positioning said lamp, by adjusting said adjustable fixture, in proximity to the near focus of said concave reflector such that a substantial amount of radiant energy emitted from said radiant energy source is directed to the far focus of said reflector;

adjusting the position of said lamp, as defined by a three-dimensional coordinate system, each coordinate of said lamp position being adjusted until a maximum intensity of light is produced at the far focus of said concave reflector;

measuring the color temperature or chromaticity characteristics of the light produced at the far focus of said concave reflector; and if said characteristics are not as predetermined, then adjusting the position of said lamp along a line parallel to the optical axis of said concave reflector until the color temperature or chromaticity characteristics of the light at the far focus of said reflector are as predetermined;

cementing said lamp into a collar of said concave reflector at the finally adjusted position to produce a completed assembly;

and removing said completed assembly from the supporting fixture.

* * * * *